United States Patent
Esselink et al.

(10) Patent No.: US 11,064,323 B2
(45) Date of Patent: Jul. 13, 2021

(54) METHOD AND APPARATUS FOR PEER TO PEER DISTRIBUTION STRATEGY FOR UPDATES

(71) Applicant: FORD GLOBAL TECHNOLOGIES, LLC, Dearborn, MI (US)

(72) Inventors: Chad Evert Esselink, Canton, MI (US); Jovan Milivoje Zagajac, Ann Arbor, MI (US); Michael Joseph Morgan, Garden City, MI (US); Safeeul Bashir Safee, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/546,797

(22) Filed: Aug. 21, 2019

(65) Prior Publication Data
US 2020/0068365 A1  Feb. 27, 2020

Related U.S. Application Data

(60) Provisional application No. 62/721,643, filed on Aug. 23, 2018.

(51) Int. Cl.
| | |
|---|---|
| *G06F 15/16* | (2006.01) |
| *H04W 4/44* | (2018.01) |
| *G06F 16/182* | (2019.01) |
| *H04L 29/08* | (2006.01) |
| *H04W 4/021* | (2018.01) |

(52) U.S. Cl.
CPC .......... *H04W 4/44* (2018.02); *G06F 16/1834* (2019.01); *H04L 67/104* (2013.01); *H04L 67/34* (2013.01); *H04W 4/021* (2013.01)

(58) Field of Classification Search
CPC ..... G06F 16/1834; G06F 8/65; H04L 67/104; H04L 67/12; H04L 67/34; H04W 4/021; H04W 4/44
USPC .......................................................... 709/217
See application file for complete search history.

(56) References Cited

U.S. PATENT DOCUMENTS

| | | | | |
|---|---|---|---|---|
| 8,848,608 | B1 * | 9/2014 | Addepalli | H04L 61/2592 370/328 |
| 9,288,270 | B1 * | 3/2016 | Penilla | G06Q 10/02 |
| 10,447,483 | B1 * | 10/2019 | Su | H04L 9/0643 |
| 10,534,819 | B2 * | 1/2020 | Ricci | B60H 1/00742 |
| 10,902,270 | B2 * | 1/2021 | Mishra | G06K 9/00973 |
| 2015/0082297 | A1 * | 3/2015 | Parry | G06F 8/65 717/173 |
| 2015/0220321 | A1 * | 8/2015 | Jung | G06F 8/65 717/169 |
| 2015/0271247 | A1 * | 9/2015 | Patsiokas | H04L 69/14 709/217 |

(Continued)

*Primary Examiner* — Moustafa M Meky
*Assistant Examiner* — Thorne E Waugh
(74) *Attorney, Agent, or Firm* — Michael Spenner Brooks Kushman P.C.

(57) ABSTRACT

A system includes a processor configured to receive a plurality of reports identifying file-chunk distribution among reporting vehicles. The processor is also configured to determine reseeding file chunks to improve distribution characteristics, responsive to the reports. The processor is further configured to determine a plurality of candidate delivery vehicles and responsive to determining that a distribution threshold has passed, send the reseeding file chunks to the determined delivery vehicles.

1 Claim, 4 Drawing Sheets

(56) References Cited

U.S. PATENT DOCUMENTS

| | | | |
|---|---|---|---|
| 2015/0286475 A1* | 10/2015 | Vangelov | G06F 8/71 |
| | | | 717/170 |
| 2016/0259637 A1* | 9/2016 | Kumar | H04W 8/245 |
| 2016/0364225 A1* | 12/2016 | Moeller | G06F 16/24568 |
| 2016/0366229 A1* | 12/2016 | Yamaura | H04L 67/42 |
| 2018/0095745 A1* | 4/2018 | Mine | G06F 8/658 |
| 2019/0058963 A1* | 2/2019 | Yu | H04W 4/80 |

* cited by examiner

METHOD AND APPARATUS FOR PEER TO PEER DISTRIBUTION STRATEGY FOR UPDATES

CROSS-REFERENCE TO RELATED APPLICATIONS

This application claims the benefit of U.S. provisional application Ser. No. 62/721,643 filed Aug. 23, 2018, the disclosure of which is hereby incorporated in its entirety by reference herein.

TECHNICAL FIELD

The illustrative embodiments generally relate to methods and apparatuses for peer to peer distribution strategy for updates.

BACKGROUND

Modern vehicles are complex computers with numerous electronic control units (ECUs) and software processes talking to each other to provide a technologically enhanced driving experience. As with most software and firmware, the files that support this interchange are periodically updated to improve functionality, improve communication and resolve errors.

Before vehicles could access wireless services, file updates were typically done manually by a user or by a mechanic or other certified technician. This had the benefit of allowing for large file transfer and update all at once, as well as error checking and update confirmation. The downside of this process was that it required a user to either understand the process enough to self-actuate it, or be willing to drive to a technician to receive an update.

Over the air updates, once vehicles were wirelessly connected, was an attempt to rectify this problem. This procedure allowed vehicles to receive software updates wirelessly. Because of the large number of vehicles on the road, however, using over the air updates for distributing even a fraction of total updates could be a potentially expensive solution. Thus, while a viable option for file updates, the amounts of money and data transfer involved have caused limited utilization of this process, especially for non-critical updates and for large fleet (such as an entire original equipment manufacturer (OEM) model line) distribution.

SUMMARY

In a first illustrative embodiment, a system includes a processor configured to receive a plurality of reports identifying file-chunk distribution among reporting vehicles. The processor is also configured to determine reseeding file chunks to improve distribution characteristics, responsive to the reports. The processor is further configured to determine a plurality of candidate delivery vehicles and responsive to determining that a distribution threshold has passed, send the reseeding file chunks to the determined delivery vehicles.

In a second illustrative embodiment, a system includes a processor configured to determine a plurality of vehicles, located within a predefined region and meeting one or more predefined seeding characteristic thresholds associated with the region. The processor is also configured to adjust characteristic thresholds to achieve a group size of the plurality of vehicles within a predefine group size range. Also, the processor is configured to deliver file chunks, representing portions of completed update files, to each of the plurality of vehicles, responsive to the group size being within the size range.

In a third illustrative embodiment, a computer-implemented method includes determining if the vehicle possesses a file chunk having a predefined preferred distribution characteristic, responsive to detecting a vehicle key-off. The method also includes setting the vehicle in a low-power state, wherein the vehicle is capable of receiving requests for the file chunk, responsive to determining that the vehicle possesses the file chunk. Further, the method includes responding to requests for the file chunk by delivering the file chunk, until a vehicle power state reaches a predefined threshold.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

A vehicle involved in peer to peer transfer and/or over the air updates may be enabled with a vehicle-based computing system that may contain a visual front end interface located in the vehicle. The user may also be able to interact with the interface if it is provided, for example, with a touchscreen display. In another illustrative embodiment, the interaction occurs through button presses, spoken dialog system with automatic speech recognition, and speech synthesis.

In such a vehicle, one or more processors control at least some portion of the operation of the vehicle-based computing system. Provided within the vehicle, the processor allows onboard processing of commands and routines. Further, the processor is connected to both non-persistent and persistent storage. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. This may include, for example, a microphone an auxiliary input, a USB input, a OPS input, a screen, which may be a touchscreen display, and a BLUETOOTH or other wireless input. An input selector may also be provided, to allow a user to swap between various inputs. Numerous vehicle components and auxiliary components in communication with the VCS may use a vehicle network (such as, but not limited to, a CAN bus) to pass data to and from the VCS (or components thereof).

Outputs to the system can include, but are not limited to, a visual display and a speaker or stereo system output. The speaker is connected to an amplifier and receives its signal from the processor through a digital-to-analog converter. Output can also be transmitted to a remote BLUETOOTH transceiver or other wireless transceiver.

Data may be communicated between the VCS and a remote network or other vehicle utilizing, for example, a data-plan, data over voice, or DTMF tones associated with a wireless device. Alternatively, it may be desirable to include an onboard modem in order to communicate data between the VCS and network.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

Vehicle transceivers can provide a variety of on-board and off-board communication, allowing for peer to peer, vehicle to infrastructure and vehicle to cloud communication. Some or all of these communication functions assist in performing the illustrative embodiments and the like.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

By allowing for limited packet size file transfer, coupled with a dynamic distribution strategy, the illustrative concepts and embodiments provide opportunities to improve the utility and functionality of over the air updates. The illustrative embodiments allow for vast saturation at a fraction of the cost of distributing updates directly to a large number of vehicles. Because the distribution strategy is adaptive, the system can also accommodate distribution delays in an effective and efficient manner. The novel, uncommon and atypical examples and concepts described herein demonstrate potential improvements achievable through use of those examples, concepts, and the like.

While it may be undesirable, or even cost-prohibitive, to use over the air (OTA) distribution to distribute a large number of updates to a large number of vehicles, distributing small portions of update files to select vehicles, and allowing those portions to propagate throughout the moving system represented by traveling vehicles, provides a distribution strategy that leverages both the capabilities of OTA delivery coupled with the vehicle to everything (V2X) communication capabilities of many modern vehicles.

By breaking a file into discrete chunks, and by strategically selecting seed vehicles to increase delivery spread, limited OTA (from the OEM to vehicles) transfer is needed, but vehicles can still receive OTA updates that do not require the user to manually update a file. By using intelligent and adaptive delivery strategies, missing file pieces (those not being distributed with sufficient speed) can be reseeded, and strategic use of stationary vehicles and roadside infrastructure can assist in maintaining a robust delivery strategy while minimizing cost and distribution time.

Figure 1:
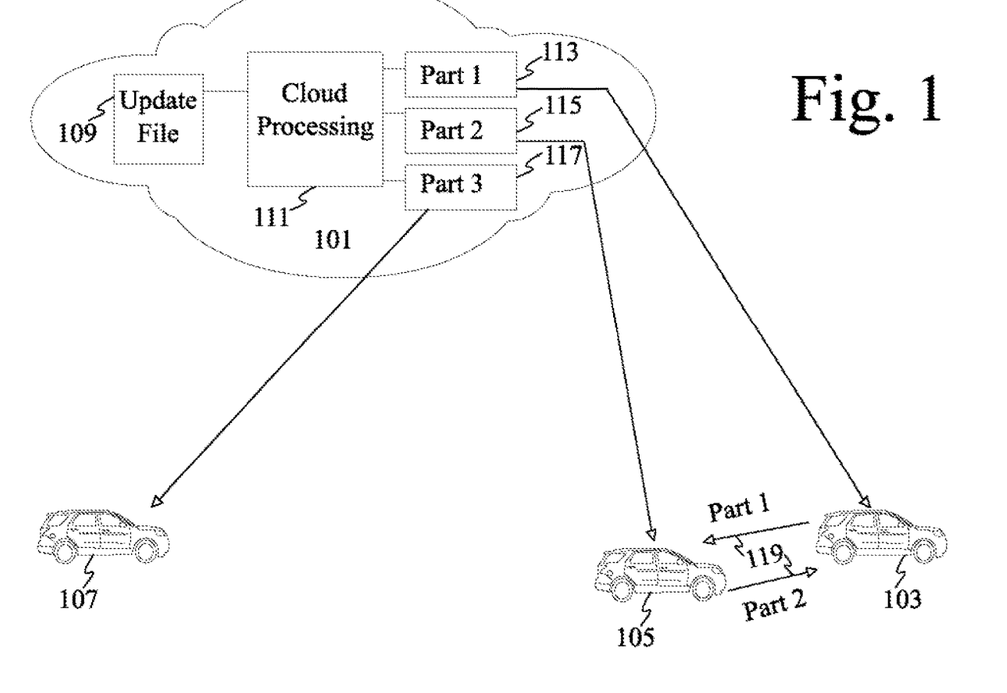
FIG. 1 shows an illustrative peer-to-peer distribution system.

FIG. 1 shows an illustrative peer-to-peer distribution system. This is a simplified example of a file distribution, in which a cloud-based 101 process 111 receives an update file 109 for distribution to a vehicle. In this example, there are three vehicles 103, 105, 107 to be updated. If the file was 300 Kb, the process would require 900 Kb of total data transfer, at least, in order to distribute the full file to each vehicle. If instead, the process broke the file into three parts 113, 115, 117, each 100 Kb in size, and sent each part to one vehicle, then the total data transferred would be closer to 300 Kb. The vehicles themselves could then transfer 119 the missing parts to each other, by using localize communication which incurs potentially zero data transfer cost to anyone.

Even in this simple example, the savings in data is 3×, and if there were 100 vehicles in need of the files, but each of the 97 other vehicles was expected or projected to pass within transfer range of one of the vehicles shown, or another of the hundred vehicles after that vehicle received some or all of the file, until eventually all vehicles had transferred all parts to each other, the data savings would be more on the order of 300×.

While some vehicles may never receive a piece of a file, especially when the file is broken into dozens of chunks or more, and may eventually have to request the missing piece(s), massive data savings can still be achieved by using the illustrative embodiments and the like.

Figure 2:
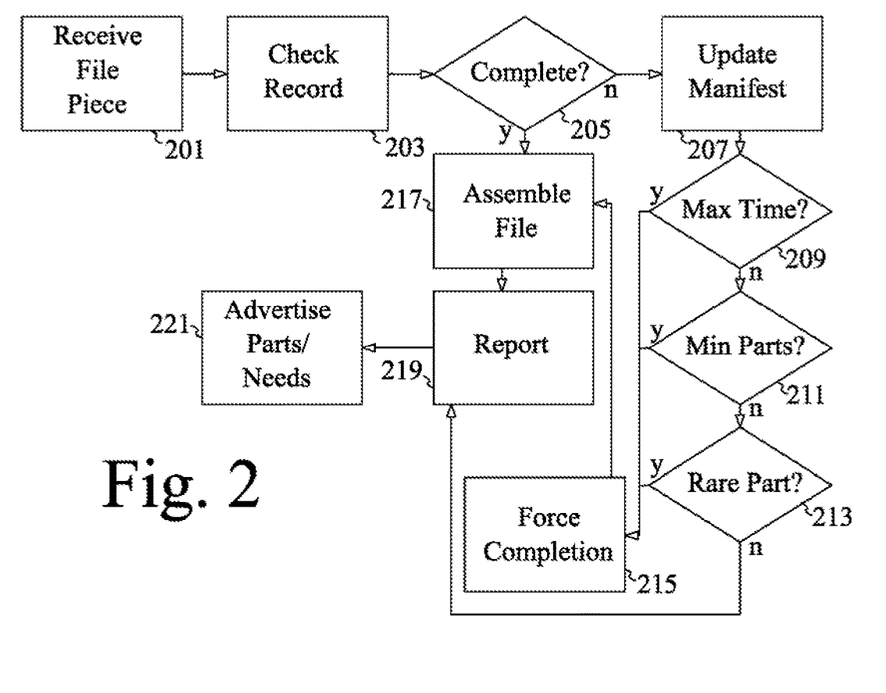
FIG. 2 shows an illustrative process for file receipt and update.

FIG. 2 shows an illustrative process for file receipt and update. In this example, the process receives 201 a file-portion from another vehicle or from an infrastructure component, for example. In addition to using vehicles to share files, the illustrative examples may leverage road-side infrastructure to distribute portions of files or commonly missing pieces, for example. These units, which may be always-on, can broadcast missing pieces, most-requested pieces, or simply use a rolling strategy to broadcast many different pieces early in an update cycle. As the cycle propagates the update, commonly missing pieces can be identified and the roadside unit broadcast may change to accommodate completion of the propagation. That is, for example, the unit may broadcast one of every 10 pieces, alternating every minute, initially. As the pieces or chunks propagate, it may be observed that chunks six and eight are not being as widely distributed, and so the units may switch to higher frequency, or exclusive provision, of chunks 6 and 8. If chunk 8 became sufficiently saturated, the unit may further change to only broadcasting chunk 6.

By choosing and placing units in locations where a high degree of traffic is observed (but which also may move at a speed sufficient to receive a chunk, e.g., at a stop light or sign), these units can be highly effective in distributing updates and improving distribution. Thus, while not always necessary, they can serve a useful purpose. Also, as these units may be wiredly connected to a network and/or have a local power supply and be always-on, they can serve a useful, localized purpose in distribution. The downside to these units is that they typically do not move, so vehicles may still be a good medium to carry the update chunks to more remote locations.

The vehicle, after receiving the update, checks 203 an onboard record of what file-portions or chunks have been received and saved. If the file is complete (all chunks received), the process may assemble 217 the update file. The process can also report 219 success (upon assembly or at an appropriate time) to the remote system. This report can also include, for example, total time to assemble, locations where chunks were received, errors in receipt, errors in chunks, and other demographics and optics that may be useful for the cloud in improving distribution strategies.

If the file is not complete, the process may update 207 an onboard manifest that indicates which chunks are present and/or which chunks are needed. This list will be useful in deciding which chunks to share and/or request from other vehicles and infrastructure.

Also, in this example, it is contemplated that vehicles will be able to self-complete partial files by requesting the remaining pieces from a server. If a vehicles is remote, or travels infrequently, it may be a while before the vehicle is able to obtain all the pieces of an update. In this example, the vehicle has three illustrative options for self-completion.

First, in this example, the process determines if a maximum update time has passed 209. For example, an update may have a maximum completion time associated therewith. This time could be appended to all chunks, so the vehicle could simply compare the "expiration date" with the current date and know if the maximum time had passed. This time may also be a function of how frequently the vehicle receives pieces and or the time since the vehicle last traveled, last received a piece, or last traveled into a geographic area associated with common file transfer. This would allow for accelerated (based on a maximum) completion based on the fact that the vehicle travels infrequently or encounters other vehicles with pieces infrequently.

Also, in this example, the process determines if a minimum number of parts (or bytes) remain 211. That is, if the total cost of transferring the remaining pieces of the file is low, the vehicle may request a last-piece or last-few pieces. Since this vehicle may also encounter other vehicles, there may be an added efficiency by allowing certain vehicles to finish their files in this manner, because the requested pieces could also be resupplied to other vehicles via peer to peer transfer.

Further, the process determines if the vehicle only has rare pieces remaining. It is reasonable to assume that certain pieces will be distributed with less frequency, as saturation is ongoing, and thus there may be some pieces that lack sufficient distribution. By allowing a vehicle that only has "rare" pieces missing to request those pieces directly, that vehicle then becomes a carrier for the rare pieces for the purposes of redistribution. Any or all of these completion functions may also be tied to a determination about others of these functions and/or the utility of the given vehicle as a seed vehicles (e.g., vehicles more likely to be good seeders may be given preferential self-completion capability).

If the parameters for self-completion are met, the process may force completion 215 by requesting the missing chunks directly from the OEM server. Again, the process could then assemble the file. Whether or not completion is finalized, the process may report statistics about the latest piece received, as well as any other data relevant to determine if self-completion occurred and/or to improve distribution efficiency. For example, if fifty vehicles in an area requested and were provided with the rarest piece of an update, the system may wait some time for those vehicles to distribute the piece before voluntarily reseeding.

After handling the received chunk, the vehicle can then advertise 221 the current set of available data and/or request any missing data from other transfer entities (E.g., other vehicles and/or roadside elements).

Figure 3:
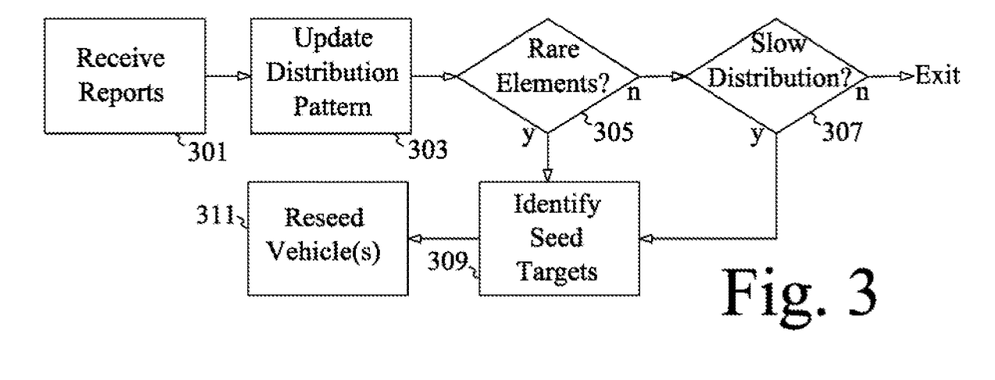
FIG. 3 shows an illustrative process for reseeding selection.

FIG. 3 shows an illustrative process for reseeding selection. In this example, the process server-side receives 301 reports from vehicles as chunks are distributed through the network of operating vehicles. This allows the server to update 303 the distribution pattern, effectively viewing which chunks are going where, which chunks are spreading where, and which vehicles now have which chunks for a likelihood of distribution determination about those vehicles.

Examining a distribution pattern may also reveal the existence of rare chunks 305, which are essentially chunks that are not being spread with sufficient frequency. Additionally or alternatively, the patterns may indicate a rate of slow distribution 307, which may indicate poor choices of seeding vehicles and/or insufficient initial seeding. All of this data can reveal both opportunities to improve seeding and opportunities to reseed certain vehicles to speed distribution.

If reseeding of rare or insufficient chunks is needed, the process can identify suitable vehicles for reseeding. In the case of slow distribution, for example, the process may use a time or geographic based threshold. In the time based instance, for example, the process may expect to see a certain volume of transfers over a certain period of time. If there are no rare pieces (i.e., if no particular pieces identify themselves as being sufficiently infrequently transferred), the process may determine that all chunks should be reseeded.

In the geographic based threshold, the process may determine an insufficiency of volume of pieces within a defined geographic region. For example, the process could heat-map chunk distribution and recognize that a certain volume of a geographic region has low or no chunk count. In another example, the process could track a travel distance associated with each chunk, by total distance or by vectors. This could be done using GPS coordinates at transfer, for example, and could determine chunk movement as well as chunk flow directionality. If all chunks tended to flow around a certain radius, for example, the process may want to reseed vehicles outside that radius and headed outwards, or vehicles projected to move in such a manner, to increase the outward flow of chunks.

Selection of reseeding vehicles may also depend on the reason for reseeding. If the distribution is not spreading fast enough, for example, in the time-based model, the process may select vehicles expected or projected to travel down major avenues of travel and/or to encounter a large number of vehicles. In the geographic model, the process may select vehicles expected or projected to travel to the unseeded areas and/or outward from the confined areas. While these are simply examples of how the reseeding determination could proceed and how the perceived shortcoming could be addressed, they generally reflect the fact that the reseeding can be adapted to a variety of reasons used as the basis for the reseeding need. For example, in the "rare" piece reseeding determination, the process could identify one or more candidate vehicles that are expected or projected to travel within areas having the lowest incidences of the rare pieces, or, in another example, candidate vehicles that are expected to encounter the most vehicles (for sharing purposes). Based on the effectiveness of the attempts for a given scenario, future reseeding optimization strategies can be adjusted accordingly.

Figure 4:
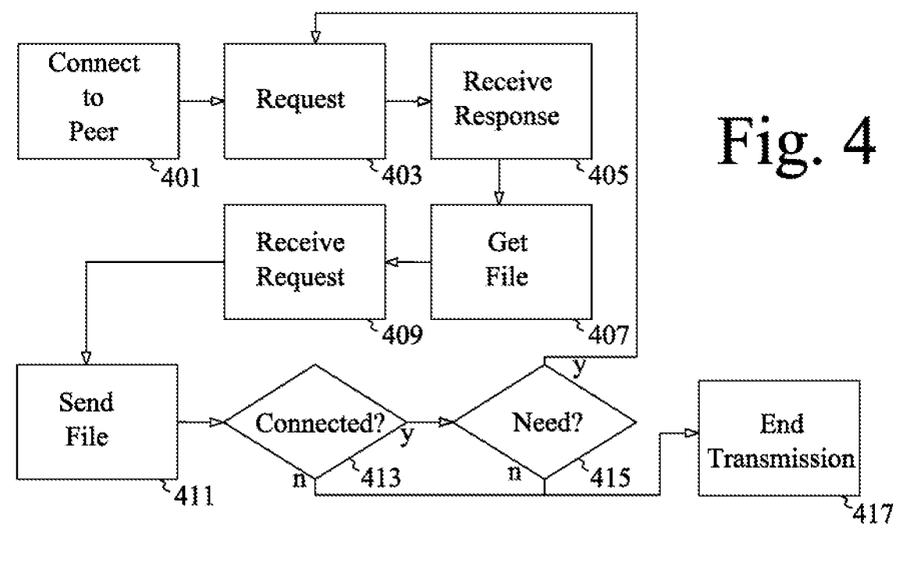
FIG. 4 shows an illustrative process for peer to peer direct transfer.

FIG. 4 shows an illustrative process for peer to peer direct transfer. In this example, the process connects 401 to another vehicle (a peer) and requests 403 one or more missing chunks. So, for example, the process could identify that it was missing chunks 1, 3 and 5. The peer could respond 405 with the fact that it possesses chunks 1 and 3, and then the process could receive 407, for example, chunk 1. Which of a plurality of chunks is chosen may be random, or it may be a function of optimized distribution, so that, for example, a least-distributed chunk (as indicated by a server or by onboard metrics) is distributed first, to improve overall chunk distribution.

The process may then receive 409 a request from the peer vehicle, the request indicating a chunk desired by the peer. The peer will either already know which chunks the object vehicle possesses (based on the original request) or the peer may identify which chunks it needs. The process responsively can send 411 the requested chunk (and/or a reply if needed), and then, if the two vehicles are still connected 413, and if either vehicle still has a need 415, the transfer loop can repeat. While not necessary, this sort of reciprocal sharing may increase distribution by taking turns sharing file chunks, so that each vehicle is improved. In some models, vehicles identified as seeding vehicles may receive all chunks first in peer to peer, before sharing any, because of their expected travel patterns, allowing them to carry the most chunks to the most other vehicles the fastest (because once they have complete files, they will need to receive no chunks and can share with all). If both vehicles need no more chunks, the process can end 413 the communication. This also happens naturally if the vehicle move outside a wireless range.

Figure 5:
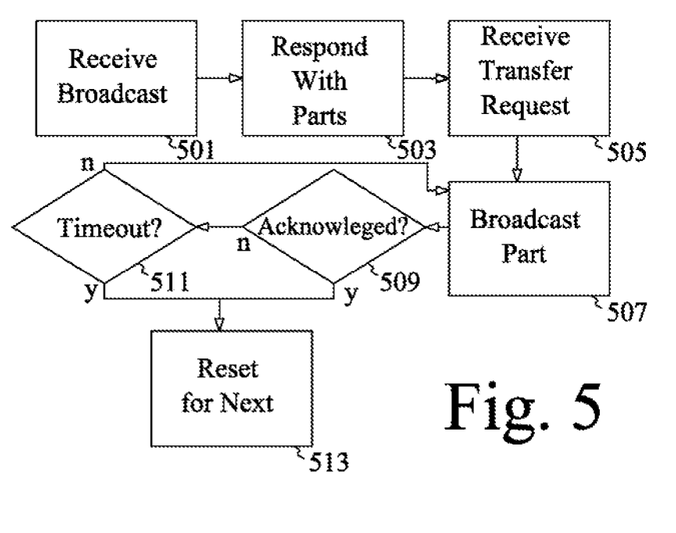
FIG. 5 shows an illustrative process for broadcast transfer.

FIG. 5 shows an illustrative process for broadcast transfer. In this example, the process uses a broadcast strategy instead of a direct transfer strategy. A given vehicle may receive 501 a broadcast from another local vehicle, indicating chunk availability (or need). If the vehicle possesses one or more chunks identified in a need-broadcast, the receiving vehicle can respond 503 to the broadcasting vehicle (through broadcast or direct communication to a vehicle ID included in the broadcasting vehicle's broadcast) with an identification of possessed chunks. The original need-broadcasting vehicle can then send a request, received 505 by the chunk-possessing vehicle. The chunk-possessing vehicle can then begin broadcasting (or directly transfer) 507 the requested chunk. If the chunk-possessing vehicle is broadcasting the chunk, other local vehicles also needing the chunk could opportunistically obtain the chunk from the broadcast as well. Once the requesting vehicle has received the chunk and acknowledged 509 the receipt, or once a certain time passes without acknowledgement 511, the sharing vehicle can cease 513 broadcast and begin broadcasting available data (or needs, or await a request).

A vehicle can broadcast both needs and available data, and when two vehicles meet and at least one can help the other, the vehicles can accommodate the meeting by having the chunk-having vehicle share with the chunk-needing vehicle. If the vehicle broadcasting the chunk makes the chunk available to additional local vehicles needing the chunk, multi-vehicle transfer of chunks can be achieved in this manner.

Figure 6:
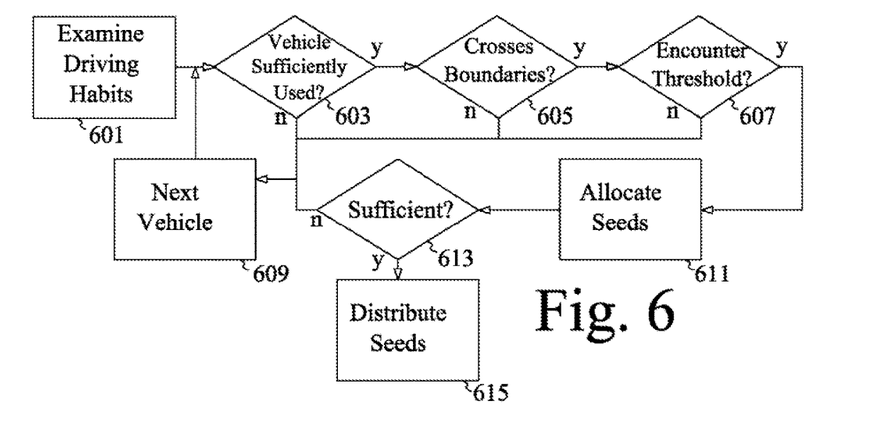
FIG. 6 shows an illustrative process for seed vehicle selection.

FIG. 6 shows an illustrative process for seed vehicle selection. This is a non-limiting example of how a seed vehicle can be selected. Seed vehicles may be selected for a given reason. For example, if a reason is to transfer the chunk to as many other vehicles as possible, the seed vehicle may be a vehicle observed to have frequent travel over roads where it will encounter many other vehicles. On the other hand, if the reason is to transfer the chunk to geographically remote regions, the seed vehicle may be a vehicle both known to travel to the remote region, and known (through observation) to travel above a certain frequency (e.g., time/distance) within the remote region, increasing the likelihood of encountering other vehicles within the remote region. When reseeding, there may be a specific reason associated with the reseeding, and the candidate reseeding vehicles may be selected to offset the reason (e.g, if the reason is that insufficient data is reaching a certain region, the offsetting reseeding vehicles may travel frequently to that region).

In this example, the process examines 601 recorded driving habits and/or route (past or current) information for a group of vehicles. This could be, for example, all vehicles on the road within a 1 hour window of a planned seeding time or times. In other examples, this group could be all vehicles known to travel through certain regions, and certain regions at certain times or with certain frequencies, etc. Some set of minimum requirements may be present, and based on observed travel behavior, the group of candidates can be initially decided by sorting.

The process can apply other filters as well. In this example, the process filters for vehicles which are used with predefined frequency 603, vehicles which cross certain geographic boundaries 605 and/or vehicles which encounter a certain number of other vehicles (over a threshold) 607 based on traffic projections or intersection encounters, for example. Some of these may be necessary characteristics, others may be secondary considerations. In this example, the process would select only those vehicles which meet all three filter characteristics, but if this resulted in too few vehicles, the process could relax the restrictions (either by threshold adjustment or choosing an OR grouping as opposed to an AND grouping). Manipulating thresholds, filters and AND/OR selectivity can provide an eventual set within a target size range. The process can allocate 611 the seeds among the vehicles (randomly or strategically) and, if the group size is sufficient 613, the process can distribute the seeds.

Observing the results of seeding certain vehicles having certain characteristics can reveal the effectiveness of both the specific vehicles and characteristics as supporting a seeding strategy, over time. This can accommodate future seeding planning and the model can be accordingly adapted. Also, a given region may have one or more predefined seeding characteristics associated therewith, which correspond to an effective (projected or observed) strategy for seeding that region. Thus, each region may have different thresholds for each characteristic and even completely different characteristics for seeding determinations.

Figure 7:
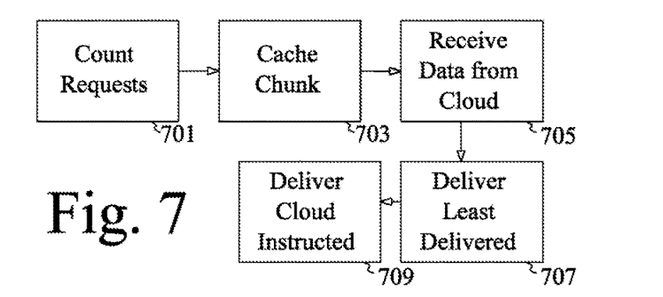
FIG. 7 shows an illustrative process for chunk selection.

FIG. 7 shows an illustrative process for chunk selection. In this example, vehicles may be instructed to deliver certain chunks first, and/or to queue certain chunks for faster delivery. For example, in this instance, the vehicle may count 701 requests for each chunk, and may cache 703 the most-requested chunk(s). This would allow for faster delivery of those chunks most commonly requested from that vehicle.

Also, in this example, the vehicle may receive 705 cloud-based instructions telling the vehicle which order to use when delivering the chunks. For example, if a vehicle possess chunks 1 and 7, and chunk 1 is heavily distributed and chunk 7 is sparsely distributed, the cloud may instruct delivery of chunk 7 first (to any vehicle needing both), in order to speed distribution of chunk 7 when both chunks cannot be delivered due to the vehicles losing contact before a second chunk can be exchanged. This can allow the cloud to adaptively speed up delivery of "rare" chunks by prioritizing them, and the vehicle can responsively deliver 707 the rare chunks first. In other examples, the cloud instructions may be slightly more complex, tying delivery strategies to present vehicle location, for example.

As one example, if the vehicle has chunks 1 and 7, and 7 is the rare chunk, the vehicle may be commonly instructed to delivery chunk 7 first. But, if the vehicle is located in a geographic portion of the region where chunk 1 happens to be locally-rare, the process may have the vehicle switch 709 to delivering chunk 1 first instead. The cloud does not actually have to know what chunks are present on a given vehicle or where the vehicle is or will be located, the cloud can simply prioritize chunks and associate any secondary parameters with secondary prioritizations (e.g., the chunk 1 example above) and deliver the strategy to some or all vehicles. The strategy itself can even be seeded and distributed, and as the cloud observes the effects of the strategy, it can adapt to newly revealed needs and redistribute a new strategy. This monitoring can help mitigate deficiencies if enacted, although the system could also allow the distribution to develop organically and compensate for the deficiencies after some protracted period of time.

Figure 8:
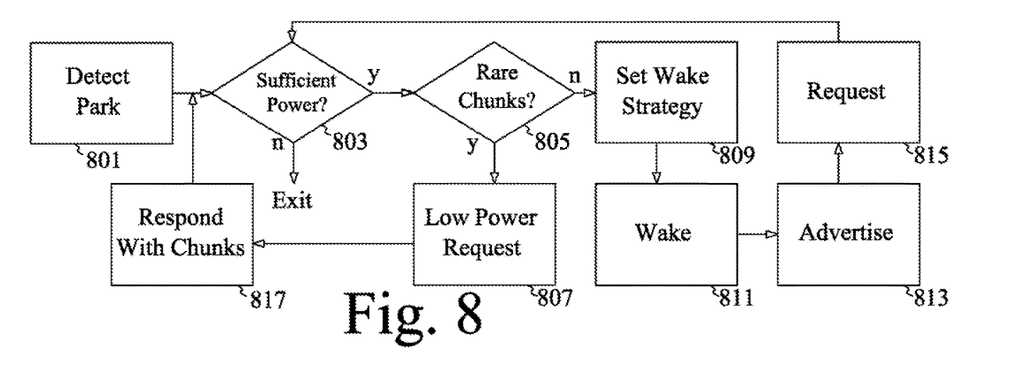
FIG. 8 shows an illustrative process for parked transfer.

FIG. 8 shows an illustrative process for parked transfer. This is a strategy for stationary vehicles, which is not limited to parked vehicles, but which can apply any time a vehicle is likely to be stationary for more than a predefined threshold time. If the vehicles is merely stopped at a light, for example, the power considerations may be less relevant. The specific strategy applies to parked, powered down vehicles, but could be easily adapted to a variety of other stopping situations, as well as could be easily modified based on the characteristics of the parked vehicle.

In this example, the process determines 801 that the vehicle is in a parked and key-off state. Since the vehicle, in this example, will be broadcasting data, and is powered off, the process determines 803 if the vehicle has sufficient power to complete a broadcast. If the vehicle has a suitable power level, the process also determines if the vehicle includes any rare chunks 805. The definition of what is a rare chunk may change over time, so this definition could be updated by a server while the vehicle is parked or updated before the vehicle is keyed off.

If the vehicle has a rare chunk, then in this example, the process may place 807 the vehicle in a low power state, capable of receiving and responding to requests for the rare chunk. The state may only be capable of receiving the request, and the vehicle may be powered up further to respond 817 to a request, and then powered back down to a listening mode to preserve power. This cycle can continue as long as power is above a predetermined threshold, for example.

The process may also determine if the vehicle is in a location suitable for delivery. This could be based on an absolute location (e.g., by a road-side) or based on a relative location (e.g., lots of surrounding vehicles), even if the vehicle itself is deep within a garage.

Even if the vehicle lacks a specific rare chunk, or if there are presently no rare chunks for a given distribution, the process may set 809 a wake strategy for a vehicle, as long as the vehicle has needs or has data to share. At predefined intervals, for example, or at certain times of day, the vehicle may wake 811 and advertise 813 (or receive requests for)

available chunks. At the same time or at different intervals, the process may also request 815 missing chunks from passing or locally parked vehicles. By allowing the vehicle to function effectively as a limited-power roadside relay in this manner, distribution can continue even when the owner is away from the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:

a processor configured to:

receive a plurality of reports identifying file-chunk distribution among reporting vehicles, including at least which chunks were received by a reporting vehicle and when each chunk was received;

determine, responsive to the reports, reseeding file chunks to improve distribution characteristics, including identifying at least one file chunk having distribution below a threshold as indicated by the reports based at least on reported incidences of the file chunk being below a volume threshold or for which reported timestamps indicate slower than a distribution time threshold;

determine a plurality of candidate delivery vehicles to receive at least the reseeding of the at least one file chunk, based on a reason associated with identification of the at least one file chunk for reseeding, the candidate vehicles exhibiting previous travel patterns which are predefined as offsetting the reason; and responsive to determining that a distribution threshold has passed, send the reseeding file chunks to the determined delivery vehicles.

* * * * *